June 25, 1957     J. E. JOHANSSON     2,797,135
NEEDLE OR ROLLER BEARING FOR MOUNTING A
CONNECTING ROD ON A GUDGEON PIN
Filed June 1, 1954
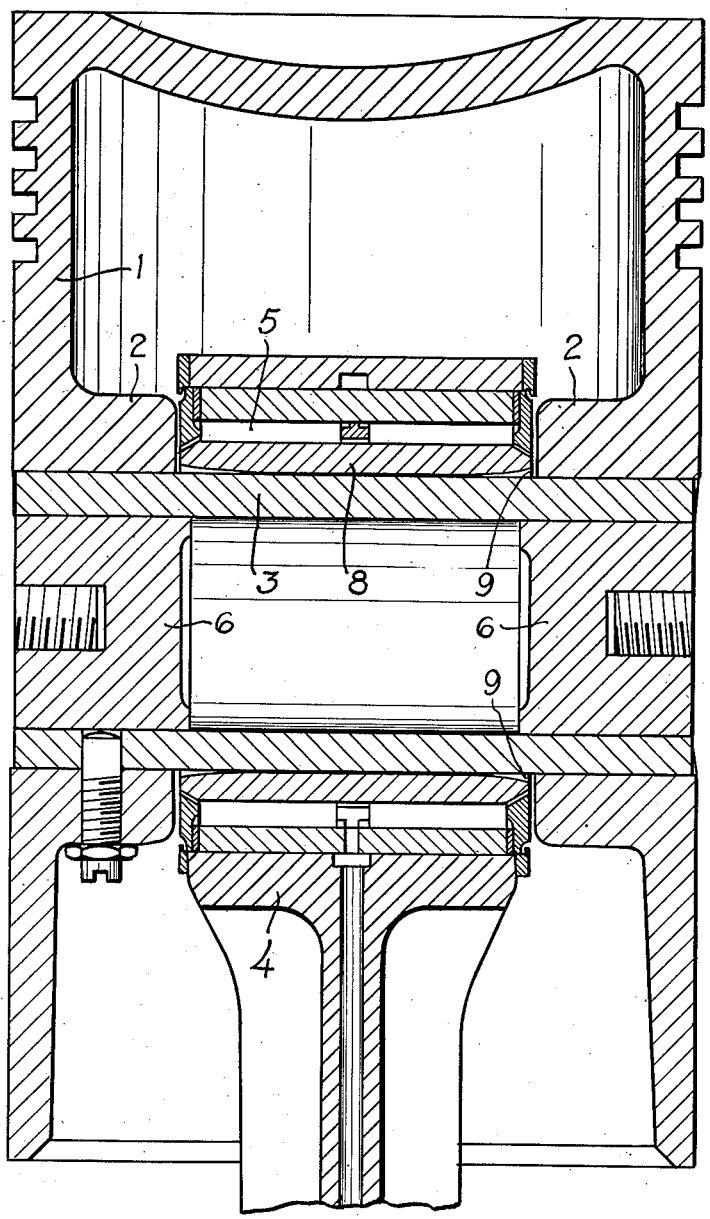
INVENTOR
Johan Erik Johansson,
BY Pierce, Scheffler + Parker,
ATTORNEYS.

United States Patent Office 2,797,135
Patented June 25, 1957

2,797,135

NEEDLE OR ROLLER BEARING FOR MOUNTING A CONNECTING ROD ON A GUDGEON PIN

Johan Erik Johansson, Goteborg, Sweden, assignor to Aktiebolaget Gotaverken, Goteborg, Sweden, a corporation of Sweden Application June 1, 1954, Serial No. 433,761

Claims priority, application Sweden June 5, 1953

2 Claims. (Cl. 309—19)

In trunk pistons, especially for internal combustion engines, it is common practice to insert expansion members into the tubular gudgeon pin, said expansion members consisting of a material having a greater coefficient of expansion than the gudgeon pin, in order to fasten the gudgeon pin in the piston under all operating conditions. The expansion members expand to a greater extent than the gudgeon pin and secure tight engagement between the pin and the piston even if the bores for the pin increase in diameter during operation of the engine.

If the connecting rod is mounted on the gudgeon pin by means of a needle or roller bearing provided with an inner race, the expansion of the gudgeon pin caused by the expansion members is likely to result in the exertion of pressures upon the ends of the race and to affect the needles or rollers, thereby damaging the bearing.

This invention has for its object to obviate the above named inconvenience and is characterized by the fact that the inner race of the bearing is conical at the ends of the race in correspondence with the expected radial thermal expansion of the gudgeon pin.

This object is attained by the construction illustrated in the accompanying drawing showing a sectional view of a piston for an internal combustion engine.

Referring to the drawing, the piston 1 is in the usual manner provided with bosses 2 having bores to receive the tubular gudgeon pin 3. The connecting rod 4 is mounted on the pin 3 by means of a roller bearing 5. The pin 3 is secured in the piston by means of two expansion members 6 inserted at the ends of the pin. The members 6 consist of a material having a coefficient of expansion greater than the pin 3 and preferably equal to or greater than the coefficient of expansion of the piston.

The roller bearing comprises an inner race 8 and extends substantially through the entire space between the bosses 2 of the piston. The expansion members 6 extend into the pin 3 through a length equal to the length of the bosses. Consequently, the deformation of the ends of the gudgeon pin caused by the expansion of the members 6 will cause radial expansion of the portions of the pin located inwardly of the end portions of the inner race.

In order to prevent the exertion of too great pressures upon the ends of the race due to the above named expansion of the pin 3, the race has an elongated central cylindrical section for seating on the gudgeon pin but is conical at its ends as indicated at 9. The length and depth of each conical face is chosen such as to correspond to the expected expansion of the pin at the temperature occurring during normal operation so as to secure contact between the pin and the race without excessive pressure. By way of example, the length of each conical face of the race may be equal to or preferably somewhat greater than the thickness of the gudgeon pin. For the sake of clearness, the angle of the conical faces of the race is exaggerated in the drawing.

The invention is not limited to the illustrated construction of the expansion members, bearing and piston which may be modified within the scope of the appending claims.

What is claimed is:

1. In a piston assembly, a piston having a tubular gudgeon pin, a roller bearing mounted on said gudgeon pin and carrying a connecting rod, expansion members inserted into both ends of said tubular gudgeon pin for securing said gudgeon pin to said piston, said expansion members having a greater coefficient of expansion than said pin, said bearing comprising an inner race carrying a plurality of rollers and having an elongated central cylindrical inner surface portion for seating on said gudgeon pin, the diameter of said inner surface gradually increasing from the opposite ends of said cylindrical portion towards the end portions of said inner race, in correspondence with the expected radial thermal expansion of the ends of said gudgeon pin.

2. A piston assembly as defined in claim 1 wherein the length of the respective inner surface portions of increasing diameter at the ends of said inner race are at least equal to the wall thickness of said gudgeon pin.

References Cited in the file of this patent

UNITED STATES PATENTS

| | | |
|---|---|---|
| 1,524,626 | Methlin | Jan. 27, 1925 |
| 2,387,634 | Anderson | Oct. 23, 1945 |

FOREIGN PATENTS

| | | |
|---|---|---|
| 680,416 | Great Britain | Oct. 1, 1952 |